*H. L. F. Gavett.*

*Excavator.*

N° 8,341. Patented Sep. 9, 1851.

UNITED STATES PATENT OFFICE.

H. L. F. GAVETT, OF JACKSON, MICHIGAN.

IMPROVEMENT IN MACHINES FOR MAKING SOD-FENCES.

Specification forming part of Letters Patent No. 8,341, dated September 9, 1851.

*To all whom it may concern:*

Be it known that I, H. L. F. GAVETT, of Jackson, in the county of Jackson and State of Michigan, have invented a new and useful Improvement in Ditching and Fencing Plows; and I do hereby declare the following to be a full, clear, and exact description of the same, reference being had to the accompanying drawings, making a part thereof, in which—

Figure 1:
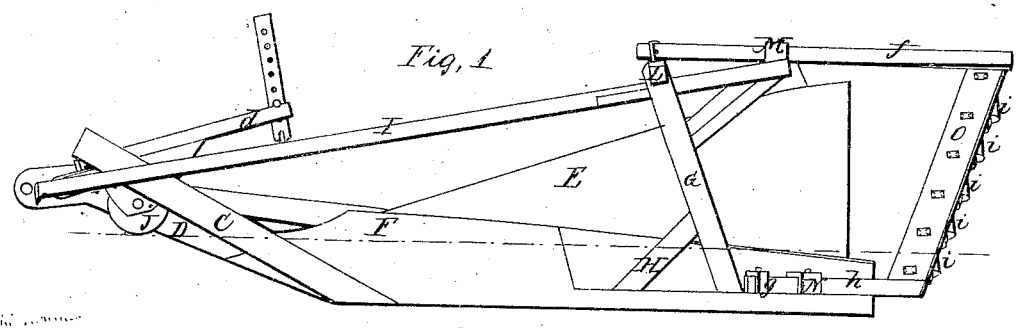
Figure 2:
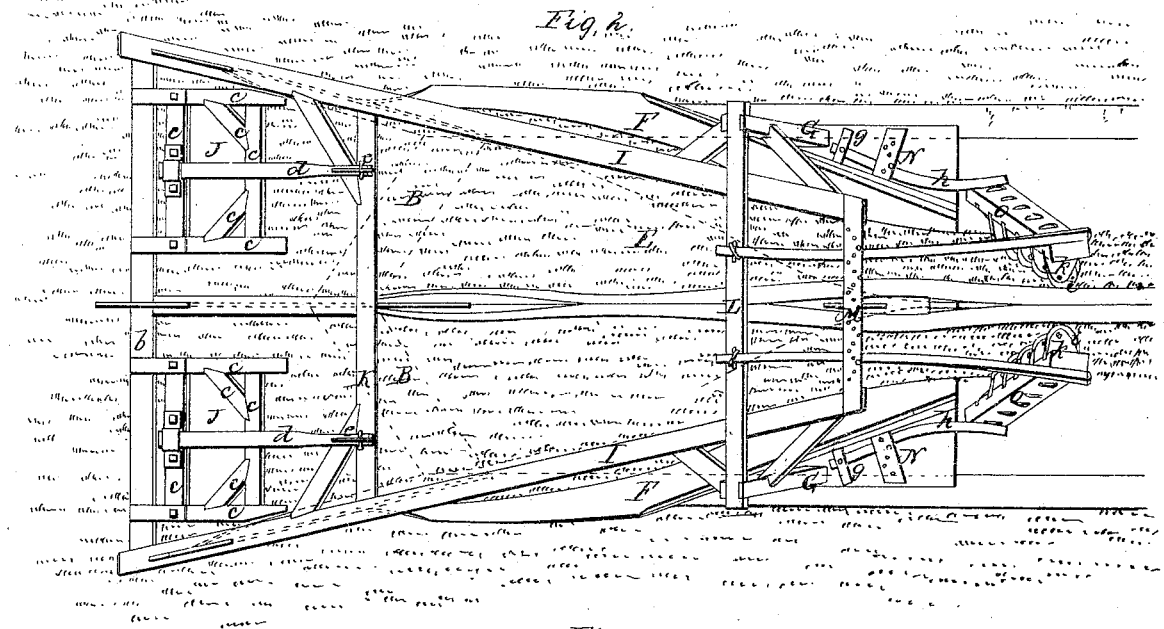

Figure 1 represents a side view of my improved plow. Fig. 2 represents a top view, and Fig. 3 a rear view, showing a section of the fence and ditches when finished.

Similar letters in the several figures represent the same parts.

The nature of my invention consists in so arranging a series of cutters and mold-boards as that two wedge-shaped slices of sod will be cut and gradually turned up upon their broader edges, when they are caught between rollers so adjusted as to press them close together, the transverse axis of said rollers being inclined so as to make a lifting and pressing motion in an upward direction, and making at one and the same operation a compact sod-fence with ditches on both sides thereof.

To enable others skilled in the art to make and use my invention, I will proceed to describe the same with reference to the drawings.

Figure 3:
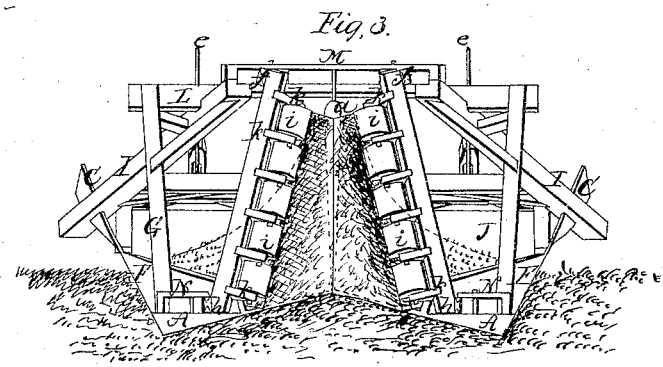

The bottom of the plow is made of two wedge-shaped pieces, A, which are securely joined together in the center and so inclined from their outsides to the center as to cut deeper at said edges than at the center, as shown in section at Fig. 3. On the front of said bottom part is arranged the knives or cutters B, (shown by dotted lines in Fig. 2,) said knives meeting in a point in the center of the plow and inclining backward, so as to make an oblique cut in the direction of the plow. These knives are for cutting loose the sod underneath and forming the bottom of the ditches. From each end of the knives or cutters B, as well as from the center thereof, where they are joined together, are arranged the outside inclined cutters, C, which form the outer edges of the ditches, and the center vertical cutting-share, D, for dividing the slice of sod in two parts. Said cutters project forward and upward sufficiently far to admit of cutting a thicker or thinner sod, as may be required. The edges of the cutters C D also present an oblique edge in the direction of the plow, so as to make a draw cut, for the purpose of more easily and smoothly separating the roots in the sod.

On top of the bottom part of the plow is arranged a double mold-board, E, which starts on a line parallel with the rear of the cutters B, and gradually rises or curves from that position until at the rear of the machine it assumes a perpendicular position with its sides tapering slightly from top to bottom, as seen by dotted lines at *a*, Fig. 3, so as to turn the sod gradually from a horizontal to a nearly vertical position.

Immediately in rear of the outside inclined cutters, C, and on the edges of the bottom of the plow, are placed the side mold-boards, F, which catch the outside edges of the sod as the plow passes through it and holds said sod on or against the mold-boards E, and as the side mold-boards, F, gradually approximate the moldboards E at the rear of the plow, it aids in turning the sod on its edge, as well as prevents it from slipping off from the plow.

The standards G, which are firmly attached to the base of the plow, are securely braced at bottom by the brace H, and on top of said standards are framed and supported the rear of the top frame, I, of the plow, the front of said frame being supported by the side and center cutters, C D, above described. To the front cross-bar, *b*, of the frame is hinged the small frames *c*, one on each side of the center cutter, D, in which are hung rollers J, which run over that portion of the sod to be cut for the fence and adjust and regulate the depth to which the bottom cutters, B, may run, as will be hereinafter described.

To the top of the frames *c* are attached the levers *d*, the extreme ends of which project rearward and are slotted so as to allow the perforated bars *e*, which are attached to the crosspiece K of the frame, to pass through said slots, and said levers *d* are kept from rising, or allowing the rollers in the frame *c* to rise, by pins passed through holes in the bars *e*. By moving the levers *d* up or down, which also allows the rollers J to rise or fall, the cutting-depth of the plow may be adjusted; and when it is desired to allow the plow to run out of the sod the frames *c*, in which the rollers are arranged, are raised up and thrown forward and the plow will immediately run out to the surface.

Near the rear of the top frame, I, is a cross-bar, L, to which are attached the spring-arms $f$, which pass between the bars M, through which bars are bored a series of holes into which are placed pins, and by which the springs may be set or adjusted for thinner or thicker sods, or for more or less pressure upon the sods, as may be found desirable, and on the bottom of the plow, outside of the mold-board F, are attached to the bars $g$ the spring-arms $h$, which pass through the bars N, also provided with a series of holes for adjusting said spring-arms to the various thicknesses of sod to be used in the construction of the fence or to the amount of pressure to be applied in forming the fence.

On the ends of these spring-arms $f$ $h$ are firmly secured the roller stocks O on each side, and into which stocks are placed a series of rollers, $i$. The roller-stock inclines backward from the rear of the machine, so as to bring the lower one of the series of rollers $i$ into use first against the sod, so as to commence packing it from the bottom. These rollers are supported and rotate in boxes or supports $k$, attached to the roller-stock O, said boxes being so arranged in said roller-stock as to bring the transverse axis of the rollers $i$ in an oblique direction, inclining upward slightly, so as to press the sod upward at the same time that the two sods are being pressed together, giving the rollers an upward and inward pressure, and as the rollers commence pressing from the bottom and come into action in regular succession it elongates the sod from bottom to top and packs it firmly in an upright position.

Having thus fully described my invention, what I claim therein as new, and desire to secure by Letters Patent, is—

The combination of the cutters and mold-boards for cutting and turning the sod on edge with the inclined adjustable spring-rollers for raising, packing, and forming the sods into a fence, as herein described and represented.

H. L. F. GAVETT.

Witnesses:
 I. HAINE,
 CHARLES B. CHAMPLIN.